US009373289B2

(12) United States Patent
Sprague et al.

(10) Patent No.: US 9,373,289 B2
(45) Date of Patent: Jun. 21, 2016

(54) DRIVING METHODS AND CIRCUIT FOR BI-STABLE DISPLAYS

(75) Inventors: Robert Sprague, Saratoga, CA (US); Andrew Ho, Atherton, CA (US); Yajuan Chen, Fremont, CA (US); Hongmei Zang, Sunnyvale, CA (US); Jialock Wong, San Leandro, CA (US); Chein Wang, Hsin-Chu (TW)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 13/597,089

(22) Filed: Aug. 28, 2012

(65) Prior Publication Data

US 2012/0320017 A1    Dec. 20, 2012

Related U.S. Application Data

(63) Continuation of application No. 12/132,238, filed on Jun. 3, 2008.

(60) Provisional application No. 60/942,585, filed on Jun. 7, 2007.

(51) Int. Cl.
*G02F 1/167* (2006.01)
*G09G 3/34* (2006.01)

(52) U.S. Cl.
CPC .................. *G09G 3/344* (2013.01); *G09G 3/34* (2013.01); *G09G 2320/0204* (2013.01); *G09G 2320/0257* (2013.01)

(58) Field of Classification Search
CPC ........................................................ G09G 3/34
USPC .................................... 345/84–107; 359/296
See application file for complete search history.

(56) References Cited

U.S. PATENT DOCUMENTS

| | | | |
|---|---|---|---|
| 3,612,758 | A | 10/1971 | Evans et al. |
| 4,143,947 | A | 3/1979 | Aftergut et al. |
| 4,259,694 | A | 3/1981 | Liao |
| 4,443,108 | A | 4/1984 | Webster |
| 4,568,975 | A | 2/1986 | Harshbarger et al. |
| 4,575,124 | A | 3/1986 | Morrison et al. |
| 5,266,937 | A | 11/1993 | DiSanto et al. |
| 5,298,993 | A | 3/1994 | Edgar et al. |
| 5,754,584 | A | 5/1998 | Durrant et al. |
| 5,831,697 | A | 11/1998 | Evanicky et al. |

(Continued)

FOREIGN PATENT DOCUMENTS

| | | | |
|---|---|---|---|
| CN | 1813279 | A | 8/2006 |
| CN | 1849639 | A | 10/2006 |

(Continued)

OTHER PUBLICATIONS

U.S. Appl. No. 13/004,763, filed Jan. 11, 2011, Lin et al.

(Continued)

*Primary Examiner* — Nicholas Lee
*Assistant Examiner* — Abdul-Samad A Adediran
(74) *Attorney, Agent, or Firm* — Perkins Coie LLP

(57) ABSTRACT

The disclosure is directed toward driving methods and a driving circuit which are particularly suitable for bi-stable displays. In certain embodiments, methods provide the fastest and most pleasing appearance to the desired image while maintaining the optimal image quality over the life expectancy of an electrophoretic display device.

6 Claims, 9 Drawing Sheets

(56) References Cited

U.S. PATENT DOCUMENTS

| | | | | |
|---|---|---|---|---|
| 5,923,315 | A | 7/1999 | Ueda et al. | |
| 5,926,617 | A | 7/1999 | Ohara et al. | |
| 5,930,026 | A | 7/1999 | Jacobson et al. | |
| 5,961,804 | A | 10/1999 | Jacobson et al. | |
| 6,005,890 | A | 12/1999 | Clow et al. | |
| 6,045,756 | A | 4/2000 | Carr et al. | |
| 6,069,971 | A | 5/2000 | Kanno et al. | |
| 6,075,506 | A | 6/2000 | Bonnett et al. | |
| 6,111,248 | A | 8/2000 | Melendez et al. | |
| 6,154,309 | A | 11/2000 | Otani et al. | |
| 6,473,072 | B1 | 10/2002 | Comiskey et al. | |
| 6,504,524 | B1 | 1/2003 | Gates et al. | |
| 6,531,997 | B1 * | 3/2003 | Gates | G02F 1/167 204/606 |
| 6,532,008 | B1 | 3/2003 | Guranlnick | |
| 6,639,580 | B1 | 10/2003 | Kishi et al. | |
| 6,657,612 | B2 | 12/2003 | Machida et al. | |
| 6,671,081 | B2 | 12/2003 | Kawai | |
| 6,674,561 | B2 | 1/2004 | Ohnishi et al. | |
| 6,686,953 | B1 | 2/2004 | Holmes | |
| 6,796,698 | B2 | 9/2004 | Sommers et al. | |
| 6,885,495 | B2 | 4/2005 | Liang et al. | |
| 6,903,716 | B2 | 6/2005 | Kawabe et al. | |
| 6,914,713 | B2 | 7/2005 | Chung et al. | |
| 6,927,755 | B2 | 8/2005 | Chang | |
| 6,930,818 | B1 | 8/2005 | Liang et al. | |
| 6,970,155 | B2 | 11/2005 | Cabrera | |
| 6,982,178 | B2 | 1/2006 | LeCain et al. | |
| 6,987,503 | B2 | 1/2006 | Inoue | |
| 6,995,550 | B2 | 2/2006 | Jacobson et al. | |
| 7,012,600 | B2 * | 3/2006 | Zehner et al. | 345/214 |
| 7,046,228 | B2 | 5/2006 | Liang et al. | |
| 7,177,066 | B2 | 2/2007 | Chung et al. | |
| 7,184,196 | B2 | 2/2007 | Ukigaya | |
| 7,202,847 | B2 | 4/2007 | Gates | |
| 7,242,514 | B2 | 7/2007 | Chung et al. | |
| 7,277,074 | B2 | 10/2007 | Shih | |
| 7,283,119 | B2 | 10/2007 | Kishi | |
| 7,307,779 | B1 | 12/2007 | Cernasov et al. | |
| 7,349,146 | B1 | 3/2008 | Douglass et al. | |
| 7,504,050 | B2 | 3/2009 | Weng et al. | |
| 7,528,822 | B2 | 5/2009 | Amundson et al. | |
| 7,705,823 | B2 | 4/2010 | Nihei et al. | |
| 7,710,376 | B2 | 5/2010 | Edo et al. | |
| 7,733,311 | B2 | 6/2010 | Amundson et al. | |
| 7,755,599 | B2 * | 7/2010 | Miyasaka | G09G 3/344 345/105 |
| 7,773,069 | B2 | 8/2010 | Miyasaka et al. | |
| 7,800,580 | B2 | 9/2010 | Johnson et al. | |
| 7,804,483 | B2 | 9/2010 | Zhou et al. | |
| 7,816,440 | B2 | 10/2010 | Matsui | |
| 7,839,381 | B2 | 11/2010 | Zhou et al. | |
| 7,952,558 | B2 * | 5/2011 | Yang et al. | 345/107 |
| 7,999,787 | B2 | 8/2011 | Amundson et al. | |
| 8,009,348 | B2 | 8/2011 | Zehner et al. | |
| 8,035,611 | B2 | 10/2011 | Sakamoto | |
| 8,054,253 | B2 * | 11/2011 | Yoo | 345/77 |
| 8,102,363 | B2 | 1/2012 | Hirayama | |
| 8,125,501 | B2 | 2/2012 | Amundson et al. | |
| 8,179,387 | B2 | 5/2012 | Shin et al. | |
| 8,243,013 | B1 * | 8/2012 | Sprague et al. | 345/107 |
| 8,274,472 | B1 * | 9/2012 | Wang et al. | 345/107 |
| 8,300,006 | B2 * | 10/2012 | Zhou et al. | 345/107 |
| 8,334,836 | B2 | 12/2012 | Kanamori et al. | |
| 8,405,600 | B2 | 3/2013 | Reis et al. | |
| 8,576,163 | B2 | 11/2013 | Miyazaki et al. | |
| 8,643,595 | B2 | 2/2014 | Chung et al. | |
| 8,704,753 | B2 | 4/2014 | Miyazaki et al. | |
| 2002/0021483 | A1 | 2/2002 | Katase | |
| 2002/0033792 | A1 | 3/2002 | Inoue | |
| 2003/0035885 | A1 | 2/2003 | Zang et al. | |
| 2003/0067666 | A1 | 4/2003 | Kawai | |
| 2003/0095090 | A1 | 5/2003 | Ham | |
| 2003/0137521 | A1 * | 7/2003 | Zehner et al. | 345/589 |
| 2003/0193565 | A1 | 10/2003 | Wen et al. | |
| 2004/0120024 | A1 | 6/2004 | Chen et al. | |
| 2004/0219306 | A1 | 11/2004 | Wang et al. | |
| 2004/0246562 | A1 | 12/2004 | Chung et al. | |
| 2004/0263450 | A1 | 12/2004 | Lee et al. | |
| 2005/0001812 | A1 | 1/2005 | Amundson et al. | |
| 2005/0162377 | A1 | 7/2005 | Zhou et al. | |
| 2005/0179642 | A1 * | 8/2005 | Wilcox | G09G 3/34 345/107 |
| 2005/0185003 | A1 | 8/2005 | Dedene et al. | |
| 2005/0210405 | A1 | 9/2005 | Ernst et al. | |
| 2005/0219184 | A1 * | 10/2005 | Zehner et al. | 345/89 |
| 2006/0023126 | A1 | 2/2006 | Johnson et al. | |
| 2006/0050361 | A1 * | 3/2006 | Johnson | 359/296 |
| 2006/0119567 | A1 | 6/2006 | Zhou et al. | |
| 2006/0132426 | A1 | 6/2006 | Johnson | |
| 2006/0139305 | A1 | 6/2006 | Zhou et al. | |
| 2006/0139309 | A1 | 6/2006 | Miyasaka | |
| 2006/0164405 | A1 | 7/2006 | Zhou | |
| 2006/0187186 | A1 | 8/2006 | Zhou et al. | |
| 2006/0232547 | A1 | 10/2006 | Johnson et al. | |
| 2006/0238488 | A1 | 10/2006 | Nihei et al. | |
| 2006/0262147 | A1 * | 11/2006 | Kimpe et al. | 345/690 |
| 2007/0013683 | A1 * | 1/2007 | Zhou et al. | 345/204 |
| 2007/0035510 | A1 * | 2/2007 | Zhou et al. | 345/107 |
| 2007/0046621 | A1 * | 3/2007 | Suwabe et al. | 345/107 |
| 2007/0046625 | A1 | 3/2007 | Yee | |
| 2007/0052668 | A1 * | 3/2007 | Zhou et al. | 345/107 |
| 2007/0070032 | A1 * | 3/2007 | Chung | G09G 3/344 345/107 |
| 2007/0080926 | A1 | 4/2007 | Zhou et al. | |
| 2007/0080928 | A1 | 4/2007 | Ishii et al. | |
| 2007/0091117 | A1 | 4/2007 | Zhou et al. | |
| 2007/0103427 | A1 | 5/2007 | Zhou et al. | |
| 2007/0109274 | A1 | 5/2007 | Reynolds | |
| 2007/0132687 | A1 | 6/2007 | Johnson | |
| 2007/0146306 | A1 * | 6/2007 | Johnson et al. | 345/107 |
| 2007/0159682 | A1 | 7/2007 | Tanaka et al. | |
| 2007/0176889 | A1 | 8/2007 | Zhou et al. | |
| 2007/0182402 | A1 | 8/2007 | Kojima | |
| 2007/0188439 | A1 | 8/2007 | Kimura et al. | |
| 2007/0247417 | A1 | 10/2007 | Miyazaki et al. | |
| 2007/0262949 | A1 | 11/2007 | Zhou et al. | |
| 2007/0276615 | A1 | 11/2007 | Cao et al. | |
| 2007/0296690 | A1 | 12/2007 | Nagasaki | |
| 2008/0150886 | A1 | 6/2008 | Johnson et al. | |
| 2008/0158142 | A1 | 7/2008 | Zhou et al. | |
| 2008/0211833 | A1 | 9/2008 | Inoue | |
| 2008/0266243 | A1 | 10/2008 | Johnson et al. | |
| 2008/0273022 | A1 | 11/2008 | Komatsu | |
| 2008/0303780 | A1 | 12/2008 | Sprague et al. | |
| 2009/0096745 | A1 | 4/2009 | Sprague et al. | |
| 2009/0267970 | A1 | 10/2009 | Wong et al. | |
| 2010/0134538 | A1 | 6/2010 | Sprague et al. | |
| 2010/0149169 | A1 | 6/2010 | Miyasaka | |
| 2010/0194733 | A1 | 8/2010 | Lin et al. | |
| 2010/0194789 | A1 | 8/2010 | Lin et al. | |
| 2010/0238203 | A1 | 9/2010 | Stroemer et al. | |
| 2010/0283804 | A1 | 11/2010 | Sprague et al. | |
| 2010/0295880 | A1 | 11/2010 | Sprague et al. | |
| 2011/0096104 | A1 | 4/2011 | Sprague et al. | |
| 2011/0175945 | A1 | 7/2011 | Lin | |
| 2011/0216104 | A1 | 9/2011 | Chan et al. | |
| 2011/0298776 | A1 | 12/2011 | Lin | |
| 2012/0120122 | A1 | 5/2012 | Lin et al. | |

FOREIGN PATENT DOCUMENTS

| | | |
|---|---|---|
| CN | 101009083 A | 8/2007 |
| CN | 101236727 | 8/2008 |
| JP | 2002-014654 | 1/2002 |
| JP | 2009192786 | 8/2009 |
| KR | 10-2008-0055331 | 6/2008 |
| TW | 200625223 | 7/2006 |
| WO | WO 01/67170 | 9/2001 |
| WO | WO 2005/004099 | 1/2005 |
| WO | WO 2005/031688 | 4/2005 |
| WO | WO 2005/034076 | 4/2005 |

(56) References Cited

FOREIGN PATENT DOCUMENTS

| | | | | |
|---|---|---|---|---|
| WO | WO 2005071651 A1 * | 8/2005 | ............... | G09G 3/34 |
| WO | WO 2009/049204 | 4/2009 | | |
| WO | WO 2010/132272 | 11/2010 | | |

OTHER PUBLICATIONS

U.S. Appl. No. 13/471,004, filed May 14, 2012, Sprague et al.

Kao, WC., (Feb. 2009) Configurable Timing Controller Design for Active Matrix Electrophoretic Dispaiy. *IEEE Transactions on Consumer Electronics*, 2009, vol. 55, Issue 1, pp. 1-5.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2

Kao, WC., Fang, CY., Chen, YY., Shen, MN., and Wong, J. (Jan. 2008) Integrating Flexible Electrophoretic Display and One-Time Password Generator in Smart Cards. *ICCE 2008 Digest of Technical Papers*, p. 4-3. (Int'l Conference on Consumer Electronics, Jan. 9-13, 2008).

Sprague, R.A. (May 18, 2011) *Active Matrix Displays for e-Readers Using Microcup Electrophoretice*. Presentation conducted at SID 2011, 49 Int'l Symposium, Seminar and Exhibition, May 15-May 20, 2011, Los Angeles Convention Center, Los Angeles, CA, USA.

* cited by examiner (First Message)

(Second Message)

(Third Message)

(Third Message With Correction)

DRIVING METHODS AND CIRCUIT FOR BI-STABLE DISPLAYS

REFERENCE TO RELATED APPLICATIONS

This is a continuation of U.S. patent application Ser. No. 12/132,238 filed on Jun. 3, 2008, which claims the benefit under 35 USC §119(e) of provisional application 60/942,585, filed Jun. 7, 2007, the entire contents of which are hereby incorporated by reference for all purposes as if fully set forth herein.

TECHNICAL FIELD

The present disclosure relates to an electrophoretic display, and more specifically, to driving approaches and circuits for an electrophoretic display.

BACKGROUND

An electrophoretic display (EPD) is a non-emissive bi-stable output device which utilizes the electrophoresis phenomenon of charged pigment particles suspended in a dielectric fluid to display graphics and/or alphanumeric characters. The display usually comprises two plates with electrodes placed opposing each other. One of the electrodes is usually transparent. The dielectric fluid which includes a suspension of electrically charged pigment particles is enclosed between the two plates. When a voltage potential is applied to the two electrodes, the pigment particles migrate toward the electrode having an opposite charge from the pigment particles, which allows viewing of either the color of the pigment particles or the color of the dielectric fluid. Alternatively, if the electrodes are applied the same polarity, the pigment particles may then migrate to the one having a higher or lower voltage potential, depending on the charge polarity of the pigment particles. Further alternatively, the dielectric fluid may have a clear fluid and two types of colored particles which migrate to opposite sides of the device when a voltage potential is applied.

There are several different types of EPDs, such as the conventional type EPD, the microcapsule-based EPD or the EPD with electrophoretic cells that are formed from parallel line reservoirs. EPDs comprising closed cells formed from microcups filled with an electrophoretic fluid and sealed with a polymeric sealing layer are disclosed in U.S. Pat. No. 6,930,818, entitled "Electrophoretic Display and Novel Process for Its Manufacture", issued on Aug. 16, 2005 to the assignee hereof, the entire contents of which is hereby incorporated herein by reference for all purposes as if fully set forth herein.

Electrophoretic type displays are often used as an output display device for showing a sequence of different or repeating images formed from pixels of different colors. Because the history of voltage potential levels applied to generate the images is different for each pixel, the voltage potential stress on each pixel of the display is typically different. These differences from pixel to pixel, in general, lead to long term issues with image uniformity. Although attempts have been made previously to alleviate such problems with waveforms that have no DC bias or by use of clearing images to reduce non-uniformity, neither of these approaches provides a practical solution to such problems for the long term.

SUMMARY OF THE DISCLOSURE

This disclosure is directed toward driving methods which are particularly suitable for electrophoretic (bi-stable) displays and which provide the fastest and most pleasing appearance to a desired image while maintaining optimal image quality over the life of an electrophoretic display device.

A first embodiment is directed toward a driving method for a multi-pixel electrophoretic display comprising a plurality of individual pixels, which method comprises applying voltage potentials across a display medium wherein the net magnitude of the voltage potentials applied, integrated over a period of time, are substantially equal for all pixels. The display medium for an electrophoretic display may be an electrophoretic fluid.

A second embodiment is directed toward a driving method for a multi-pixel electrophoretic display comprising a plurality of individual pixels, which method comprises applying driving pulses to a given pixel wherein the total number of resets to a first color state and the total number of resets to a second color state are substantially equal, for the given pixel over a period of time. If there are more than two color states, substantially equal numbers of resets to each color state may be used, for a given pixel.

A third embodiment is directed toward a driving method for a multi-pixel electrophoretic display comprising a plurality of individual pixels, which method comprises applying driving pulses to the pixels wherein the sums of resets to all states are substantially equal for all pixels. In a more general case having more than two color states, the total numbers of resets to all color states are substantially equal for all pixels.

A fourth embodiment is directed toward a driving method for a electrophoretic display comprising a plurality of individual pixels, which method comprises applying driving pulses to the pixels wherein the pixels are reset to a given color state after a certain number of the driving pulses.

A fifth embodiment is directed toward a driving method for a multi-pixel electrophoretic display comprising a plurality of individual pixels, which method comprises applying driving pulses to the pixels wherein the pixels have the substantially equal numbers of resets to each color state. As in the other embodiments listed above, this method can be generalized to more than two color states.

A sixth embodiment is directed toward a driving method for a multi-pixel electrophoretic display device, in which a corrective waveform is applied to ensure global DC balance (i.e., the average voltage potential applied across the display is substantially zero when integrated over a period of time) or to correct any of the imbalance in the first, second, third, fourth or fifth embodiment of the disclosure as described above. The corrective waveform is applied without affecting or interfering with the driving of individual pixels to intended images and may be applied at a time when the electrophoretic display would not normally be in the process of being viewed by a viewer.

The driving methods of the present disclosure can be applied to drive electrophoretic displays including, but not limited to, one time applications or multiple display images (i.e., burst mode display application). They also could be used with many other display types which potentially suffer from the same lifetime issues.

In a further embodiment, a bi-stable driving circuit is provided which is suitable for implementing the various driving methods disclosed herein.

The whole content of each of the other documents referred to in this application is also hereby incorporated by reference into this application in its entirety for all purposes as if fully set forth herein.

DETAILED DESCRIPTION

Figure 1:
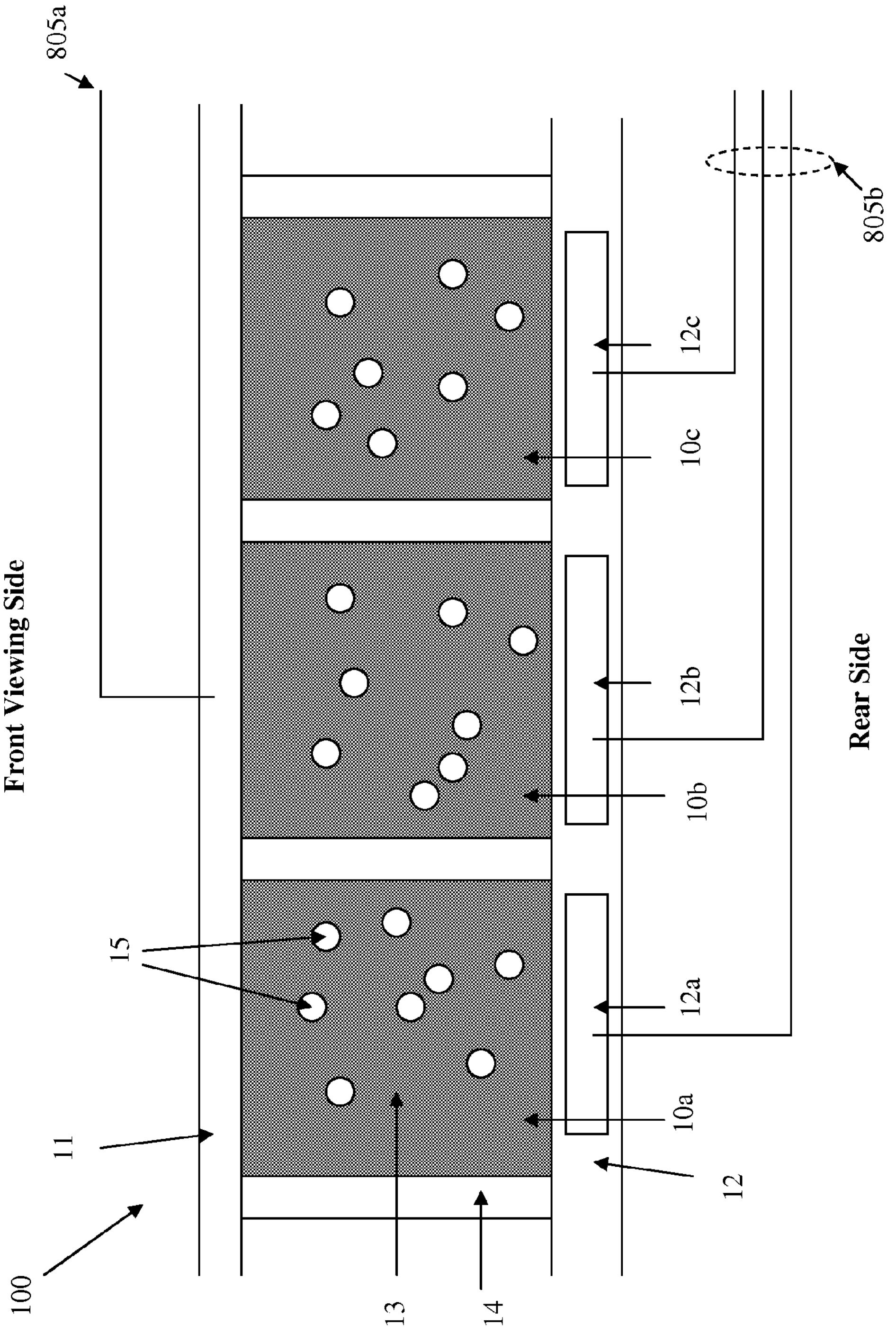
FIG. 1 is a cross-section view of a typical electrophoretic display device.

FIG. 1 illustrates a typical array of electrophoretic display cells 10*a*, 10*b* and 10*c* in a multi-pixel display 100 which may be driven by the various driving implementations presented herein. In FIG. 1, the electrophoretic display cells 10*a*, 10*b*, 10*c*, on the front viewing side, are provided with a common electrode 11 (which is usually transparent). On the opposing side (i.e., the rear side) of the electrophoretic display cells 10*a*, 10*b* and 10*c*, a substrate (12) includes discrete electrodes 12*a*, 12*b* and 12*c*, respectively. Each of the discrete electrodes 12*a*, 12*b* and 12*c* defines an individual pixel of the multi-pixel electrophoretic display 100, in FIG. 1. However, in practice, a plurality of display cells (as a pixel) may be associated with one discrete pixel electrode.

An electrophoretic fluid 13 is filled in each of the electrophoretic display cells 10*a*, 10*b*, 10*c*. The discrete electrodes 12*a*, 12*b*, 12*c* may be segmented in nature rather than pixellated, defining regions of an image to be displayed rather than individual pixels. Therefore, while the term "pixel" or "pixels" is frequently used in this disclosure to illustrate driving implementations, the driving implementations are also applicable to segmented displays.

Each of the electrophoretic display cells 10*a*, 10*b*, 10*c* is surrounded by display cell walls 14. For ease of illustration of the methods described below, the electrophoretic fluid 13 is assumed to comprise white charged pigment particles 15 dispersed in a dark color electrophoretic fluid 13.

The white charged particles 15 may be positively charged so that they will be drawn to a discrete pixel electrode 12*a*, 12*b*, 12*c* or the common electrode 11, whichever is at an opposite voltage potential from that of white charged particles 15. If the same polarity is applied to the discrete pixel electrode and the common electrode in a display cell, the positively charged pigment particles will then be drawn to the electrode which has a lower voltage potential.

In another embodiment, the white charged pigment particles 15 may also be negatively charged.

Also, as would be apparent to a person having ordinary skill in the art, the white charged particles 15 could be replaced with charged particles which are dark in color and an electrophoretic fluid 13 that is light in color so long as sufficient contrast is provided to be visually discernable.

In a first embodiment, the electrophoretic display 100 could also be made with a transparent or lightly colored electrophoretic fluid 13 and charged particles 15 having two different colors carrying opposite particle charges, and/or having differing electro-kinetic properties.

The electrophoretic display cells 10*a*, 10*b*, 10*c* may be of a conventional walled or partition type, a microencapsulted type or a microcup type. In the microcup type, the electrophoretic display cells 10*a*, 10*b*, 10*c* may be sealed with a top sealing layer. There may also be an adhesive layer between the electrophoretic display cells 10*a*, 10*b*, 10*c* and the common electrode 11.

In one embodiment, a driving implementation for an electrophoretic display 100 comprising pixels is disclosed. In this embodiment, varying voltage potentials are applied across the electrophoretic fluid 13 such that the net vector magnitudes of the voltage potentials applied to the individual pixels 12*a*, 12*b*, 12*c*, when integrated over a period of time, are substantially equal for all pixels 12*a*, 12*b*, 12*c* of the electrophoretic display 100. In this embodiment, variations in the net vector magnitudes of the voltage potentials applied to the individual pixels 12*a*, 12*b*, 12*c* when integrated over a period of time should be maintained within a tolerance of about 20%. However, tighter tolerances in the net vector magnitudes of the applied voltage potentials of less than about 10% provides improved image quality and possibly longer electrophoretic display life. Ideally, tolerances in the net vector magnitudes of the applied voltage potentials in a range of 0-2% provides the greatest improvement in displayed image quality but may require more costly electronics to maintain tolerances in this range.

In a second embodiment, a driving implementation for an electrophoretic display 100 comprising pixels 12*a*, 12*b*, 12*c* utilizes driving pulses applied to a given pixel 12*a*, 12*b*, or 12*c* in order to maintain a cumulative number of "resets" between a first and second color state for the given pixel to be maintained substantially equal over a period of time.

The term "reset" is defined as applying a driving voltage pulse to the given pixel to cause the given pixel to change from an original color state to a different color state or from an original color state to a different shade of the original color state. The reset may occur as part of the driving voltage pulse method to cause images to change in the course of normal pixel operation, for the reduction of flicker effects or may be used to correct for "history effects" provided by the passive and persistent display nature of electrophoretic type displays. For correction of "history effects," the reset may occur when the electrophoretic display 100 is not in active use or idle. The driving voltage potential pulse is applied across the electrophoretic fluid 13.

Since there are many different ways in which a reset can be accomplished, and since the different types of resets have different impacts on the uniformity and lifetime of a multi-pixel electrophoretic display 100, only some of the reset scenarios may be implemented in the methods described herein; depending on the time required for implementation and on the cost of implementation. The following table illustrates different reset scenarios for the term "reset":

TABLE 1

RESET SCENARIOS

| Scenario | Reset to White | Reset to Dark |
|---|---|---|
| Scenario I | Dark to white | white to dark |
| Scenario II | white to white | dark to dark |
| Scenario III | intermediate to white | intermediate to dark |
| Scenario IV | dark to white | white to dark |
| | white to white | dark to dark |
| Scenario V | dark to white | white to dark |
| | intermediate to white | intermediate to dark |
| Scenario VI | white to white | dark to dark |
| | intermediate to white | intermediate to dark |
| Scenario VII | dark to white | white to dark |
| | white to white | dark to dark |
| | intermediate to white | intermediate to dark |

The term "intermediate" color state, in the context of the present disclosure, is a mid-tone color between a first color state and a second color state or a composite color of the first and second color states. For ease of illustration and understanding, it is assumed in the above Table 1 that the first and second color states are white and dark. However, it is understood that in a two color display system, the two colors may be any two colors so long as they provide sufficient contrast to be differentiated by visual observation.

In the driving implementation discussed above, a pixel 12*a*, 12*b*, or 12*c* may have $N^1$ number of resets to the white state and $N^2$ number of resets to the dark state where the number $N^1$ and $N^2$ are substantially equal.

However, depending on the reset scenario selected, the resets may be counted differently. For example, if Reset Scenario I is selected, only the "dark to white" and "white to dark" are counted and, in other words, a pixel has $N^1$ switches from "dark to white" and $N^2$ switches from "white to dark".

Alternately, if Reset Scenario IV is selected, the reset to white will include not only "dark to white" but also "white to white" and the reset to dark will include not only "white to dark" but also "dark to dark" and, in this case, the total number of resets from "dark to white" and "white to white" would be N' and the total number of resets from "white to dark" and "dark to dark" would be $N^2$. As is apparent, the ten "reset" may be any one of the possible reset scenarios as described in Table 1, which are applicable to all driving implementations described in the present disclosure.

A third embodiment is directed toward a driving implementation for an electrophoretic display 100 comprising pixels 12*a*, 12*b*, 12*c*. In this embodiment, driving pulses are applied to the pixels 12*a*, 12*b*, 12*c* where the sums of reset to all states are substantially equal, for all pixels. For example, in this driving implementation, a given pixel may have $N^3$ number of total resets to a first color state and a second color state, and where the remaining pixels also have a number of total resets to the two color states which number is substantially equal to $N^3$. Furthermore, in this embodiment, the numbers of resets to a particular color state may be the same or different among various pixels, although the cumulative number of color resets is substantially the same. For example, a first pixel may be driven to the first color state 60 times and to the second color state 40 times while a second pixel may be driven to the first color state 70 times and to the second color state 30 times. Both the first and second pixels are driven to alternate color states 100 times but not necessarily to the first and second color states equally.

In a fourth embodiment, a driving implementation for a electrophoretic display 100 comprising pixels 12*a*, 12*b*, 12*c*, is provided where the pixels are reset to a pre-determined color state after a certain number of driving pulses have been applied to the pixels without regard to any particular pixel. For example, a reset to each pixel's original color is provided after 10,000 driving pulses have occurred. Alternately, rather than counting the number of driving pulses, all pixels may be driven to a pre-determined color state based on a pre-determined amount of operating time. In this alternate embodiment, all of the pixels may not have been applied substantially equal numbers of driving pulses before they are driven to the pre-determined reset state.

In another alternate embodiment, each pixel is reset to a pre-determined color state when a pre-determined number of driving pulses have been received. However, since the operation of individual pixels varies, not all pixels will be driven to the reset color state at about the same point in time.

In a fifth embodiment, a driving implementation for a electrophoretic display 100 comprising pixels 12*a*, 12*b*, 12*c* is provided where the pixels are voltage potential driven to have substantially equal numbers of resets to each color state. For example, a given pixel may have $N^4$ number of resets to a first color state and $N^5$ number of resets to a second color state; likewise, in this embodiment, the remaining pixels also have a number of resets substantially equal to the first and second color states of N4 and $N^5$, respectively. As is apparent in this fifth embodiment, the pixels are voltage pulse driven such that the number of resets to the first and second color states are substantially equal.

For example, if Reset Scenario V is selected, all pixels are voltage pulse driven to have $N^4$ resets to the white state (including "dark to white" and "intermediate to white") and $N^5$ resets to the dark state (including "white to dark" and "intermediate to dark"). In a further example, if Reset Scenario VII is selected, all pixels are voltage pulse driven to have $N^4$ resets to the white state (including "dark to white", "intermediate to white" and "white to white") and $N^5$ resets to the dark state (including "white to dark", "intermediate to dark" and "dark to dark"). In all of these examples, $N^4$ is substantially equal to $N^5$.

In this and other embodiments, variation in the number of resets is intended to be maintained within a tolerance of about 20%. However, tighter tolerances in the number of resets of less than about 10% provides improved image quality and possibly longer electrophoretic display life. Ideally, tolerances in the number of resets in a range of 0-2% provides the greatest improvement in displayed image quality but as discussed previously may be more costly to implement.

In a sixth embodiment, a corrective waveform is applied to the common electrode 11 and the individual pixel 12*a*, 12*b*, 12*c* electrodes to ensure global DC balance of the electrophoretic fluid 13 contained in each electrophoretic cell 10*a*, 10*b*, 10*c*. The corrective waveform attempts to normalize the voltage potentials applied to the electrophoretic fluid 13 so that substantially a net zero volts exist when integrated over a period of time. The global DC balance is considered to be sufficiently obtained if an imbalance of less than 90 volt·sec (i.e., 0 to about 90 volt·sec) is accumulated over a period of at least about 60 seconds. Improved results are realized if the imbalance of less than 90 volt·sec is achieved over a range of about 60 minutes to about 60 hours. The application of the corrective waveform assists in maintaining uniformity of the electrophoretic fluid 13 among all of the electrophoretic cells 10*a*, 10*b*, 10*c* of the multi-pixel electrophoretic display 100. The corrective waveform may also be applied in addition to any of the pixel reset scenarios discussed above in the first, second, third, fourth or fifth embodiment. The corrective waveform is typically applied at a later time so that it does not interfere with the driving of pixels to intended images. The global DC balance and other types of balance as described in the present disclosure are important for maintaining maximum long term contrast and freedom from residual images.

In this embodiment of the disclosure, programmable circuits are used to correct for the DC imbalance at periodic intervals utilizing a corrective equalizing waveform. For example, a microcontroller 800 (FIG. 8) may be used to keep track of the level of DC imbalance, and correct for imbalances on a regular basis. The microcontroller 800 may comprise a memory element 802 which records the cumulative number of voltage pulses applied to a given pixel, or a number of resets to a given color state for each pixel, over a period of time. At some periodic interval (i.e., once per predetermined time period, or some time after a sequence of driving voltage pulse waveforms), a separate corrective waveform may also be applied which substantially compensates for DC imbalances recorded in the memory 802. Amore detailed discussion of the microcontroller 800 and associated circuitry is provided in FIG. 8 below.

The corrective waveform may be accomplished either at a separate time when the electrophoretic display 100 would be expected to be idle or when it would otherwise not interfere with normal driving of intended pixels (i.e., during normal display), or as an extension of another predetermined waveform so as to not be visually discernable. For example, a corrective waveform is provided at a duration or rate not discernable to an Observer. Several embodiments of this corrective driving implementation can be envisioned, depending on the intended applications. A few of these are described below. However, a person having ordinary skill in the art will appreciate that many variations of the methods disclosed below may be provided.

In a first embodiment, a corrective waveform is used and imbalances in pixels 12*a*, 12*b*, 12*c* may be corrected at a time when an electrophoretic display 100 is not in operation, for example, in the middle of the night or at a predetermined time when the electrophoretic display 100 is not expected to be in use. Although many applications are perceived for this method of achieving the balance, a smartcard having an integrated electrophoretic display 100 or other similar security token devices are examples which may benefit from a corrective waveform. For example, when a smartcard is used, a user wants to review the displayed information as quickly and easily as possible, but following use, the smartcard is then typically disposed in the user's wallet for the majority of time, so that a corrective waveform applied at a later time will rarely be observed by the user.

In a second embodiment, no corrective waveform is required. Instead, a longer driving voltage potential pulse is applied. This approach is particularly useful if the longer driving voltage potential pulse is at the end of a normal driving sequence so that there would be no visual impact on the image displayed. The additional amount of time required for the driving pulse is determined by a microcontroller 800 and should be sufficiently long in order to compensate for the imbalance which have been stored in the memory 802 of the microcontroller 800 based on the driving history or changes in color state of the pixels 12*a*, 12*b*, 12*c* (FIG. 1)

An imbalance of too many white pixels may be corrected by applying a longer driving pulse when the white pixels are driven to the dark state, especially if the dark state occurs at the end of a normal driving sequence. Such a corrective waveform extension can be used to correct for DC imbalance or net vector magnitudes of applied voltage potentials to the pixels 12*a*, 12*b*, 12*c* as discussed above. In embodiments of the disclosure involving equalization of the number of resets, the extended corrective waveform comprises a number of resets used to achieve the correction. This embodiment of the disclosure is demonstrated in Example 5 below.

In a third embodiment of this corrective driving implementation, the DC imbalance may also be corrected with a color flash (i.e., driving all pixels to a predetermined color state, sometimes referred to as a "white flash,") at the beginning of the next sequence of normal display waveforms. For normalizing the global DC balance, this will allow for a zero time average DC bias and help to display cleaner images. However, this driving implementation may provide an undesirable initial display flash at the time of initiation of the next sequence of waveforms.

The driving implementations of the present disclosure are applicable to a variety of electrophoretic displays. In an electrophoretic display 100 with a traditional up-down switching mode, the charged pigment particles 15 move in a vertical direction between the electrodes 11 and 12*a*, 12*b*, 12*c* as shown in FIG. 1, depending on the voltage potentials applied to the electrode layers 11 and 12*a*, 12*b*, 12*c*. If the electrophoretic display fluid 13 comprises charged white particles 15 dispersed in a dark color fluid, the images displayed by this electrophoretic display 100 would be in white/dark colors.

The driving implementations of the present disclosure may also be applied to an electrophoretic display with an in-plane switching mode. Examples of in-plane switching electrophoretic display are described in E. Kishi, et al., "5.1: Development of In-plane EPD", Canon Research Center, SID 00 Digest, pages 24-27 (2000); Sally A. Swanson, et al. (2000); "5.2: High Performance EPDs", IBM Almaden Research Center, SID 00 Digest, pages 29-31 (2000); and U.S. Pat. No. 6,885,495, entitled "Electrophoretic Display with In-plane Switching", issued Apr. 26, 2005, to the assignee hereof, the entire contents of all the above documents are incorporated by reference herein in their entirety as if fully set forth herein. A typical in-plane switching electrophoretic display may also exhibit two contrasting colors.

Furthermore, the driving implementations described herein may also be adapted to a electrophoretic display which is capable of displaying more than two color states, such as a dual mode electrophoretic display as described in U.S. Pat. No. 7,046,228, entitled "Electrophoretic Display with Dual Mode Switching," issued on May 6, 2006 to the assignee hereof, the content of which is herein incorporated by reference in its entirety for all purposes as if fully set forth herein.

EXAMPLES

For ease of illustration and understanding of the various corrective waveforms of the present disclosure, a set of drawings is provided in FIG. 2 to FIG. 7. With respect to FIG. 2 to FIG. 7, the electrophoretic display 100 (FIG. 1) is assumed to be comprise white charged pigment particles 15 dispersed in a dark electrophoretic color fluid 13 and the particles 15 are positively charged so that they will be drawn to a discrete pixel electrode 12*a*, 12*b*, 12*c* or the common electrode 11, whichever has an opposite polarity or at a lower voltage potential.

Example 1

One Time Display Implementation

In this example, some of the images would be displayed on the electrophoretic display 100 only once. For one time display implementations, the displayed image on the electrophoretic display 100 is to be turned off or cleared after a pre-determined display period, for example, a one time password used in a smartcard application. After the onetime password is generated and displayed, the password image should be cleared for security reasons. In this implementation, the electrophoretic display 100 will be driven to the dark state and then wait for the next driving sequence.

Figure 2:
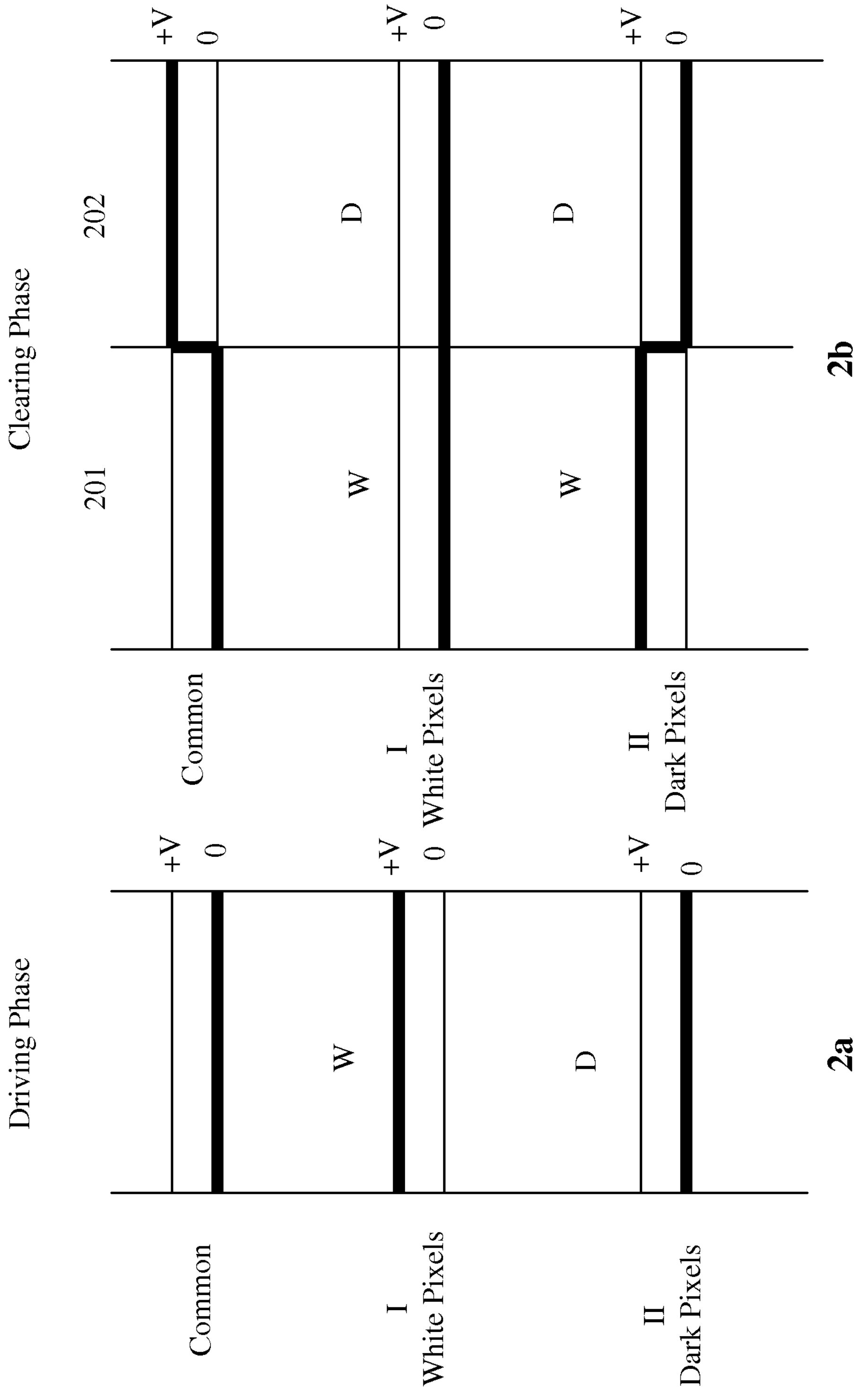
FIG. 2*a* and FIG. 2*b* illustrate a one time display driving implementation.

FIG. 2 illustrates one of the onetime display driving embodiments, In this embodiment, the initial color state or the "off" state of the electrophoretic display 100 is represented by the dark color state of the electrophoretic fluid 13 (display medium.) As depicted, the driving implementation has two phases, a driving phase and a clearing phase. The driving phase is shown in FIG. 2*a*. The clearing phase, as shown in FIG. 2*b*, has two frames 201 and 202. The top waveform in FIG. 2*a* shows that no voltage potential is applied to the common electrode in the driving phase. Waveform I in FIG. 2*a* shows a voltage potential of +V is applied to drive the white pixels from the dark state (i.e., "off state") to the white (visible) state. Waveform II shows that no voltage potential is applied so that the dark pixels remain in the dark state during the driving phase.

In the clearing phase as shown in FIG. 2*b*, no voltage potential is applied in frame 201 and a voltage potential of +V is applied in frame 202, to the common electrode 11 (FIG. 1) For the white pixels to be cleared, initially no voltage potential is applied across the display medium 13 in frame 201 and the white pixels remain white in frame 201 followed by a voltage potential of −V (shown as a net "0" V value) being applied across the display medium 13 in frame 202 which causes the white pixels to revert to the dark state (the "off" state) in frame 202. In this approach the common is +V and the pixel is 0, and therefore the net voltage potential is −V. For the dark pixels to be cleared (i.e., to remain dark in the dark state), a voltage potential of +V is applied across the display medium 13 in frame 201 which drives the dark pixels to the white state in frame 201 and a voltage potential of −V (shown as a net "0" V value) is applied across the display medium 13 in frame 202 which drives the dark pixels back to the dark "off" state in frame 202. Therefore at the end of the clearing phase, both the white and dark pixels are returned to the original dark "off" state. In the driving implementation of FIG. 2, when the duration of the driving phase of FIG. 2*a* is substantially equal to that of frame 202 shown in FIG. 2*b* and the durations of the frames 201 and 202 are also substantially equal, a global DC balance can be achieved. The driving implementation of FIG. 2 also represents the first embodiment of the disclosure, that is, the net vector magnitudes of the voltage potentials applied, integrated over a period of time, are substantially equal for all pixels (i.e., white and dark), provided that when the duration of the driving phase is substantially equal to that of frame 202 and the durations of the frames 201 and 202 are also substantially equal.

The driving implementation of FIG. 2 also represents the second embodiment of the disclosure, that is, the number of resets to the white state (D to W) is equal to the number of resets to the dark state (W to D), for each pixel. The driving implementation of FIG. 2 further represents the third embodiment of the disclosure, that is, the total number of resets to the dark state and to the total number of resets to white state are the same for both white and dark pixels (i.e., 2). The driving implementation of FIG. 2 further represents the fourth embodiment of the disclosure, that is, all pixels are reset to the dark state after a series of driving pulses.

The driving implementation of FIG. 2 further represents the fifth embodiment of the disclosure as all pixels have the same number of resets to the white state and the same number of resets to the dark state.

Example 2

Alternative One Time Display Implementation

Figure 3:
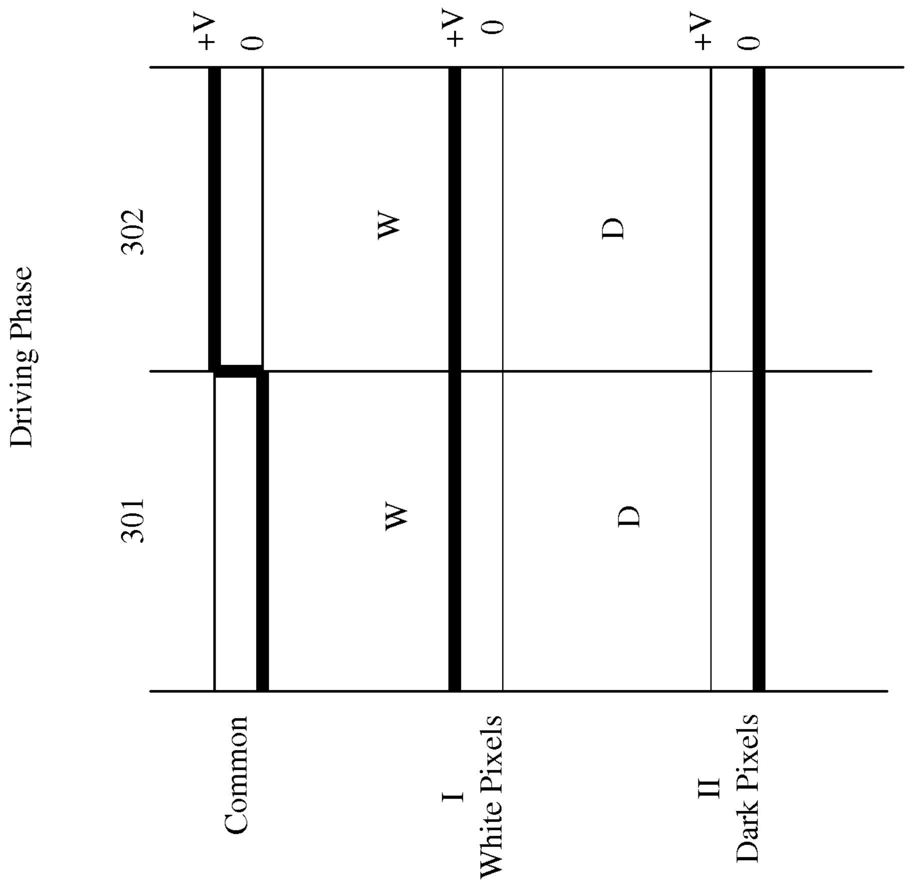
FIG. 3 illustrates an alternative driving implementation for a one time display.

Experience has shown that if an electrophoretic display remains inactive for an extended period of time, the performance of transitioning from the dark state to the white state or vice versa may become degraded, and the dark state may have assumed a less than optimal charge value. FIG. 3 illustrates an alternative driving phase to that in FIG. 2 to address this issue. As shown in the FIG. 3, the driving phase in this alternative implementation has two driving frames, 301 and 302. For the common electrode 11 (FIG. 1) in this driving implementation, no voltage potential is applied in driving frame 301 and a voltage potential of +V is applied in driving frame 302. Waveform I drives pixels from the dark "off" state to the white state by applying across the display medium 13 a voltage potential of +V frame 301 and no voltage potential in frame 302 and as a result, the pixels switch to the white state in frame 301 and remain in the white state in frame 302. Waveform II, on the other hand, keeps pixels in the dark state by applying across the display medium no voltage potential in frame 301 and a voltage potential of −V (shown as a net "0" V value) in frame 302 and in this case, the dark pixels remain dark in driving frame 301 and further driven to the dark state in frame 302. The addition of the driving frame 302 has the effect of improved contrast ratio, especially if the electrophoretic display has undergone a prolonged period of inactivity. The clearing phase of this implementation is the same as that of FIG. 2*b*.

The duration of driving frame 301 does not have to be equal to the duration of driving frame 302. However, in order to maintain the global DC balance discussed above, the duration of frame 301 is generally maintained substantially equal in duration to that of the frame 202. Accordingly, the duration sum of driving frame 302 and frame 202 (FIG. 2) are substantially equal to the duration of frame 201.

Example 3

Multiple Message Display Implementation

Figure 8:
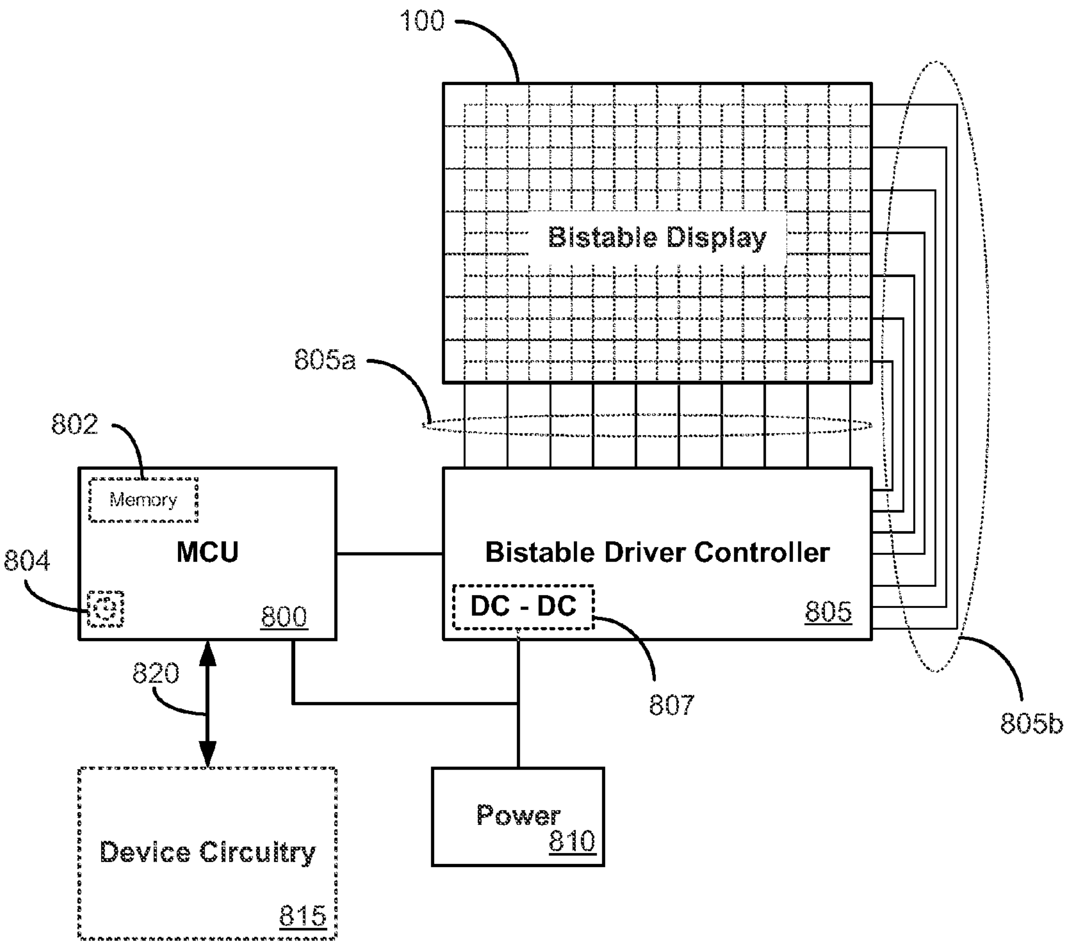
FIG. 8 depicts an exemplary driving circuit suitable for implementation of the various embodiments disclosed herein.

An electrophoretic display may display multiple images sequentially. The multiple messages may be shown in sequence within a short period of time (e.g., 1-2 minutes) and the final message may remain for a longer period of time unless cleared or corrected. The multiple messages may be displayed one after another or the multiple messages may be a repeat of two or more messages, switching back and forth as driven by a microcontroller 800 (FIG. 8)

Figure 4:
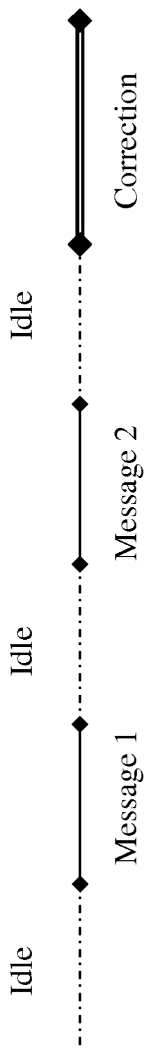
FIG. 4 is a diagram which shows how multiple messages may be displayed in succession.

FIG. 4 depicts an example as to how multiple messages may be displayed in succession. In the sequence as shown, the "idle" time between messages is optional. The final message in the sequence may remain for a period of time, if needed. A corrective waveform may be applied between messages (not shown) or after the second message has been displayed to drive the white pixels to the dark state and provide DC balancing as briefly discussed above and discussed in more detail with respect to FIG. 5 below. To illustrate a clear example, FIG. 4 shows two messages followed by a correction, but other embodiments may use three or more messages.

FIG. 5 depicts one of the driving implementations for multiple messages. For exemplary purposes, FIG. 5*a*, FIG. 5*b*, and FIG. 5*c* provide a string of three consecutive messages, First Message, Second Message and Third Message. Each of the messages is provided with a clearing phase and a driving phase. For all three messages in this implementation, the common electrode 11 (FIG. 1) is always applied a voltage potential of +V in the clearing phase and no voltage potential is applied in the driving phase.

Figure 5A:
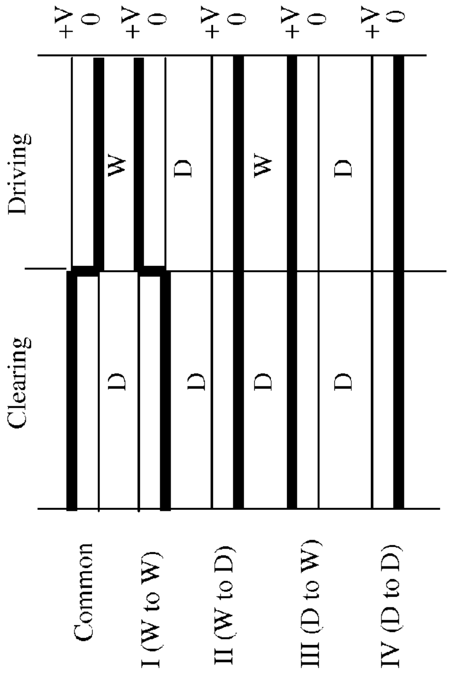
FIG. 5*a*, FIG. 5*b*, and FIG. 5*c* illustrate a driving implementation for multiple messages.

In FIG. 5*a* (First Message), for Waveform I representing white pixels to remain in the white state, a voltage potential of −V (shown as a net "0" V value) is applied across the display medium 13 in the clearing phase and a voltage potential of +V is applied across the display medium 13 in the driving phase, and in this case, the white pixels are driven to the dark state in the clearing phase and then back to the white state in the driving phase. For Waveform II representing white pixels to driven to the dark state, a voltage potential of −V (shown as a net "0" V value) is applied across the display medium 13 in the clearing phase and no voltage potential is applied across the display medium 13 in the driving phase, and as a result, the white pixels are driven to the dark state in the clearing phase and remain in the dark state in the driving phase. For Waveform III representing dark pixels to be driven to the white state, no voltage potential is applied across the display medium 113 in the clearing phase and a voltage potential of +V is applied across the display medium 13 in the driving phase, and in this case, the dark pixels remain in the dark state in the clearing phase and are driven to the white state in the driving phase. For Waveform IV representing dark pixels to remain in the dark state, a voltage potential of −V (shown as a net "0" V value) is applied across the display medium 13 in the clearing phase and no voltage potential is applied across the display medium in the driving phase, and as a result, the dark pixels remain in the dark state in both the clearing and driving phases. The Third Message (FIG. 5*c*) has the same driving waveforms as the First Message (FIG. 5*a*). However, the Second Message, between the First and Third Messages has different waveforms from I and IV.

Figure 5B:
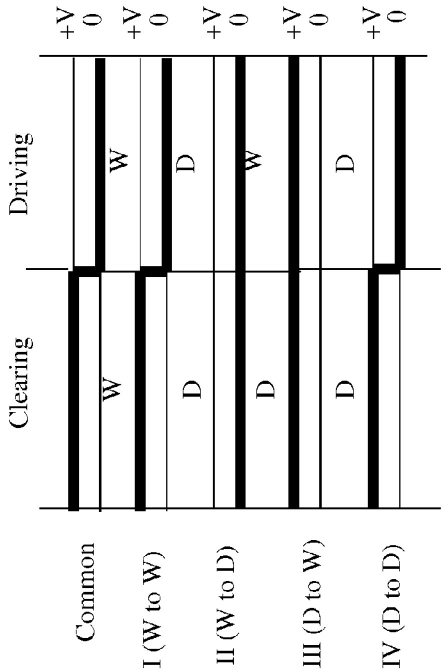
Figure 5C:
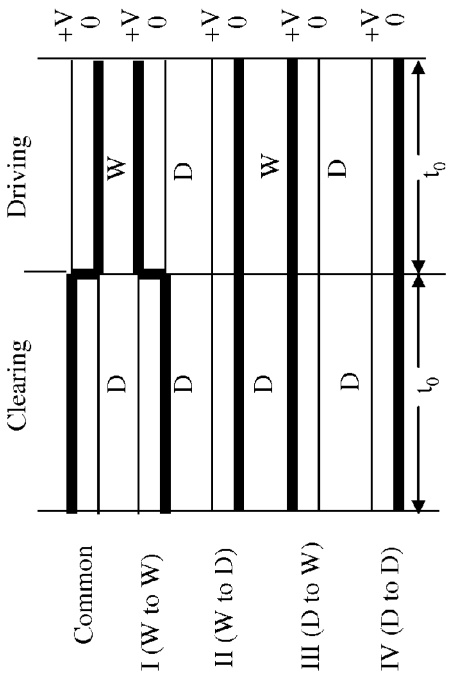

In FIG. 5*b* (Second Message), Waveforms II and III are the same as those of FIG. 5*a* and FIG. 5*c*. However, for Waveform I representing white pixels to remain white, no voltage potential is applied across the display medium 13 in either the clearing or driving phases, and in this case, the white pixels remain white in the clearing and driving phases. For Waveform IV representing dark pixels to remain in the dark state, no voltage potential is applied across the display medium 13 in both the clearing and driving phases, and as a result, the dark pixels remain in the dark state in the clearing and driving phases.

The driving implementation as depicted in FIG. 5 has certain features. For example, no pixels need to be driven if there is no color state change in the Second Message (see Waveforms I and IV of FIG. 5*b*). If there is a required change in the color state in pixels caused by the Second Message, the pixels are driven to the desired color state accordingly. In the First and Third Messages, a white pixel remaining in the white state is driven to the dark state first and back to the white state and a dark pixel remaining in the dark state is re-driven to the dark state first, to ensure refreshing of the dark pixels. Depending on the implementation, an idle time may be provided between each of the messages. The idle time, as stated above, is optional.

The driving implementation for multiple messages as described in this example has many advantages. For example, only pixels having color state change in consecutive messages are driven. Therefore, the image change may occur at a high speed. In addition, the driving implementation also provides refreshing of pixels to maintain good bistability. A corrective waveform may be added at the end of the driving sequence to correct any DC imbalances (see Examples 4 and 5 below) occurring from non-uniform pixel operation.

Example 4

Offline Corrective of Global DC Balance

In this example, the Waveforms I-IV described above for FIG. 5*a*, FIG. 5*b*, and FIG. 5*c* are used to illustrate the use of a post corrective waveform. The driving implementation of Example 3 above provides a very clean image switching sequence for displaying multiple messages; however, this implementation could generate a DC imbalance which if left uncompensated, could cause image degradation in some circumstances.

Table 2 shows various combinations of driving scenarios for a string of three messages. According to Table 2, the waveforms of Example 3 (see FIG. 5) may give a maximum imbalance, at the end of the entire sequence, of 1(−V), 0 or 1(+V), assuming that all the driving and clearing waveform elements have the same duration ($t_0$).

TABLE 2

Driving Sequence for Three Consecutive Messages

| First Message | | Second Message | | Last Message | | | Balance Case Utilization | | |
|---|---|---|---|---|---|---|---|---|---|
| Transition | Applied Voltage potential | Transition | Applied Voltage potential | Transition | Applied Voltage potential | # of DC Offset | Total # of Driving Pulses | Total # of Driving Pulses to White | Total # of Driving Pulses to Dark |
| W-W | 0 | W-W | 0 | W-W | 0 | 0 | 0 | 0 | 0 |
| | 0 | | 0 | | 0 | 0 | 0 | 0 | 0 |
| | 0 | | 0 | W-D | −V | 1(−V) | 1 | 0 | 1 |
| | 0 | | 0 | | −V | 1(−V) | 1 | 0 | 1 |
| | 0 | W-D | −V | D-W | +V | 0 | 2 | 1 | 1 |
| | 0 | | −V | | +V | 0 | 2 | 1 | 1 |
| | 0 | | −V | D-D | 0 | 1(−V) | 1 | 0 | 1 |
| | 0 | | −V | | 0 | 1(−V) | 1 | 0 | 1 |
| W-D | −V | D-W | +V | W-W | 0 | 0 | 2 | 1 | 1 |
| | −V | | +V | | 0 | 0 | 2 | 1 | 1 |
| | −V | | +V | W-D | −V | 1(V) | 3 | 1 | 2 |
| | −V | | +V | | −V | 1(−V) | 3 | 1 | 2 |
| | −V | D-D | 0 | D-W | +V | 0 | 2 | 1 | 1 |
| | −V | | 0 | | +V | 0 | 2 | 1 | 1 |
| | −V | | 0 | D-D | 0 | 1(−V) | 1 | 0 | 1 |
| | −V | | 0 | | 0 | 1(−V) | 1 | 0 | 1 |
| D-W | +V | W-W | 0 | W-W | 0 | 1(+V) | 1 | 1 | 0 |
| | +V | | 0 | | 0 | 1(+V) | 1 | 1 | 0 |
| | +V | | 0 | W-D | −V | 0 | 2 | 1 | 1 |
| | +V | | 0 | | −V | 0 | 2 | 1 | 1 |
| | +V | W-D | −V | D-W | +V | 1(+V) | 3 | 2 | 1 |
| | +V | | −V | | +V | 1(+V) | 3 | 2 | 1 |
| | +V | | −V | D-D | 0 | 0 | 2 | 1 | 1 |
| | +V | | −V | | 0 | 0 | 2 | 1 | 1 |
| D-D | −V | D-W | +V | W-W | 0 | 0 | 2 | 1 | 1 |
| | −V | | +V | | 0 | 0 | 2 | 1 | 1 |
| | −V | | +V | W-D | −V | 1(−V) | 3 | 1 | 2 |
| | −V | | +V | | −V | 1(−V) | 3 | 1 | 2 |
| | −V | D-D | 0 | D-W | +V | 0 | 2 | 1 | 1 |

TABLE 2-continued

| Driving Sequence for Three Consecutive Messages | | | | | | | | | |
|---|---|---|---|---|---|---|---|---|---|
| First Message | | Second Message | | Last Message | | | Balance Case Utilization | | |
| Transition | Applied Voltage potential | Transition | Applied Voltage potential | Transition | Applied Voltage potential | # of DC Offset | Total # of Driving Pulses | Total # of Driving Pulses to White | Total # of Driving Pulses to Dark |
| | −V | | 0 | | +V | 0 | 2 | 1 | 1 |
| | −V | | 0 | D-D | 0 | 1(−V) | 1 | 0 | 1 |
| | −V | | 0 | | 0 | 1(−V) | 1 | 0 | 1 |

Figure 6:
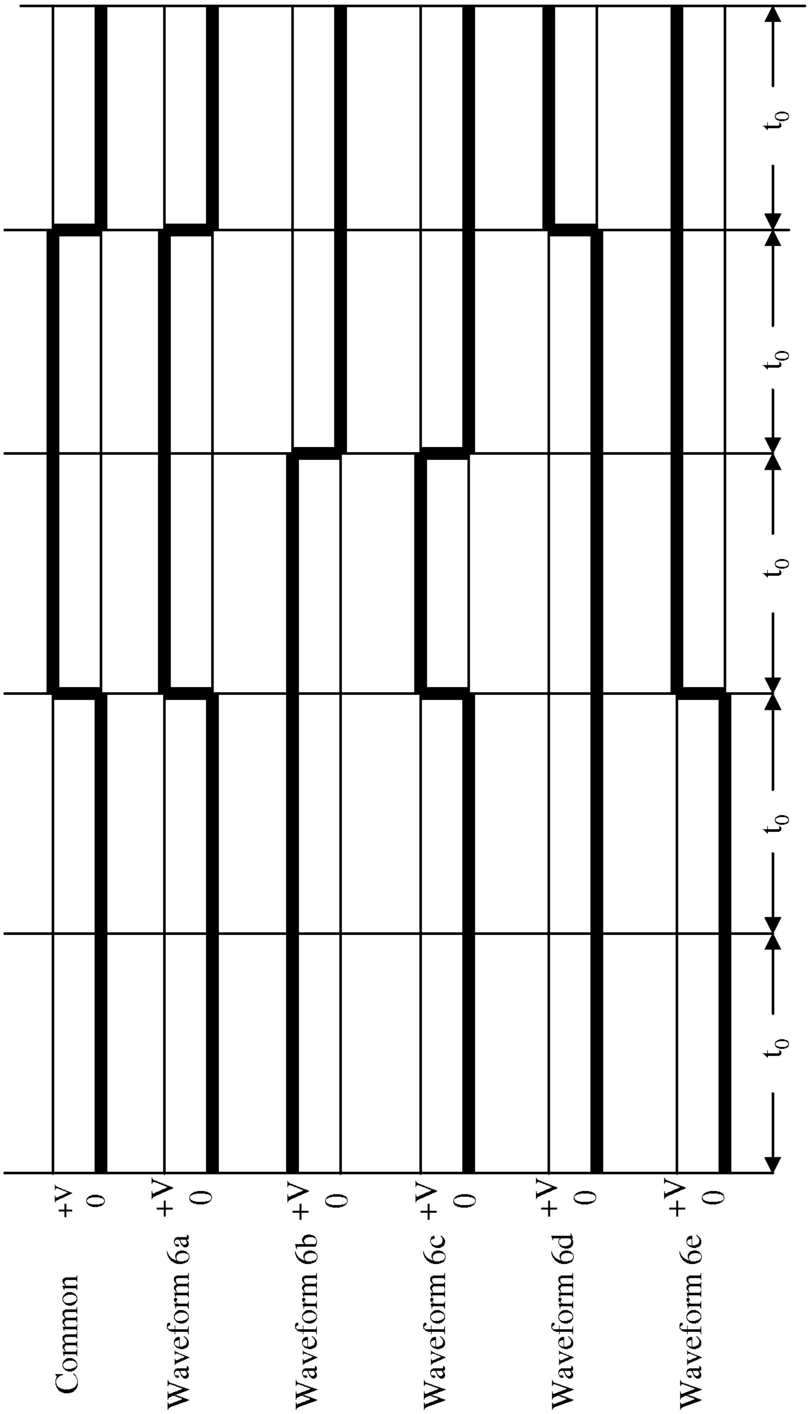
FIG. 6 depicts exemplary corrective waveforms.

FIG. 6 shows the waveforms for correcting the DC imbalance when the corrective waveforms are initiated at some time after the end of the last message set (Third Message), for example, after 30 seconds. If there is no DC imbalance in the driving sequence for a given pixel, such as that shown in the rows in Table 2 with zero DC offset, the corrective Waveform 6*a* (FIG. 6) may be applied which does not impact any currently displayed images. If the desired end state is dark and there is an imbalance of one dark pixel 1(−V), the corrective Waveform 6*b* may be applied. If the desired end state is dark and there is an imbalance of one white pixel 1(+V), Waveform 6*c* may be applied. If the desired end state is white and there is an imbalance of one white pixel 1(+V), the corrective Waveform 6*d* may be applied. If the desired end state is white and there is an imbalance of one dark pixel 1(−V), then Waveform 6*e* may be applied. The combined set of waveforms shown in FIG. 5*a*, FIG. 5*b*, FIG. 5*c* and FIG. 6 will correct the DC imbalance.

When any of the corrective waveforms is applied, if for any reason, there is another message demand before, for example, the 30 second interval, that message demand would override the corrective waveform and display the additional message, and after that second message is complete and another 30 seconds has expired, then one of appropriate corrective waveforms is applied a sufficient number of times to correct for the net imbalance achieved since the last correction. If the additional message causes additional imbalances, for example, of 1(−V), the Waveform 6*b* or 6*e* may then need to be applied twice to correct the imbalance of 2(−V). The example only demonstrates a few possible corrective waveforms, which can be modified or extended in a wide number of corrective waveforms to compensate for different levels of DC imbalance. In a similar manner, any of the imbalances in the first through fifth embodiments of this disclosure may also be corrected.

Example 5

Figure 5D:
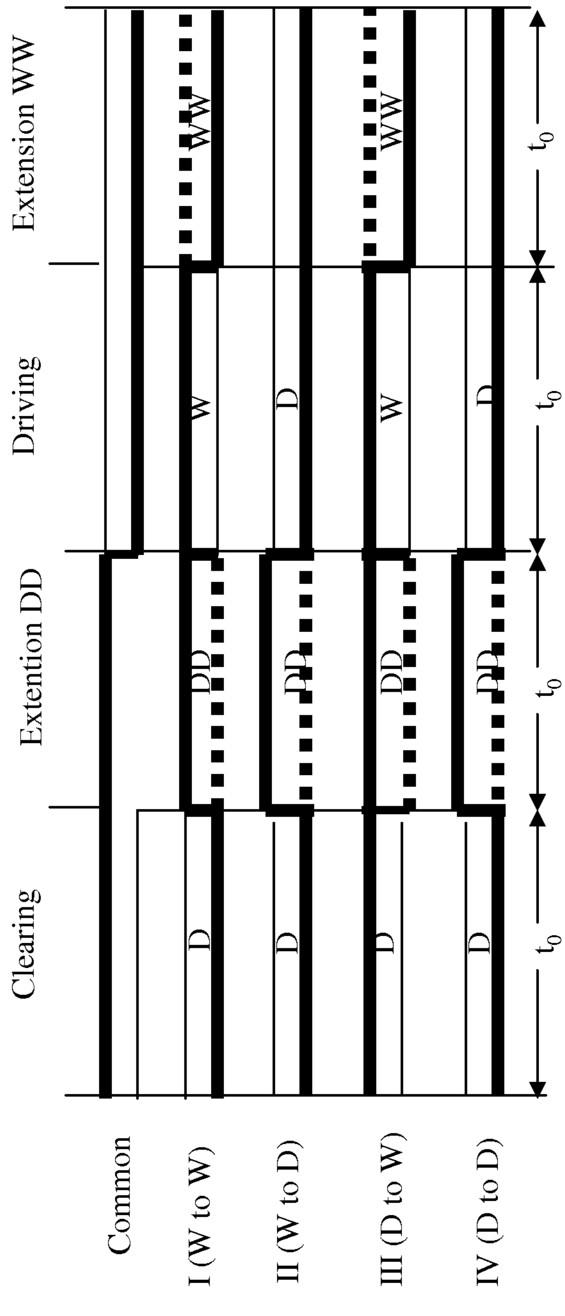
FIG. 5*d* illustrates extended waveforms for correction of DC imbalance.

In another corrective waveform technique, rather than adding a separate corrective waveform, the existing waveforms are extended to correct a DC imbalance which can be achieved in a way not visually discernable. For example, FIG. 5*d* shows an extended version of the Third Message of FIG. 5*c*. In FIG. 5*d*, a set of waveforms “Extension DD” is added between the original clearing and driving phases and another set of waveforms “Extension WW” is added after the driving phase. In the extended phases, each waveform is presented with two options, shown as the solid and dotted lines. The dotted lines indicate that the voltage potentials for the dark or white states have been extended in time to correct an imbalance from previous messages. The solid lines indicate that a waveform in which no voltage potential difference is applied across the display medium, so that no change in the image state occurs and no visible impact on the images displayed is observed, except that the time of the waveforms for the Third Message is lengthened to allow dotted frames DD or WW. As is apparent from this waveform, not every pixel can be corrected in this way. For example, in Waveforms II and IV, the pixels in the dark state cannot be corrected with extended Waveforms WW; and as a result, they cannot be balanced until subsequent waveforms are applied in which a corrective opportunity occurs. The microcontroller 800 (FIG. 8) simply keeps track of which pixels need to be corrected and adds the extra length of waveforms at an opportune time.

Numerous applications may utilize the above driving implementations in one form or another. Some examples include, without limitation, electronic books, personal digital assistants, mobile computers, mobile phones, cellular phones, digital cameras, electronic price tags, digital clocks, smartcards, security tokens, electronic test equipment and electronic papers.

The present techniques may be applied to a wide variety of the electronic devices. The smartcard is one of many examples. The smartcard can be used for any application requiring information to be displayed including, but not limited to, a stored value from an internal memory of the device, a generated password from the internal electronics of the device and a transferred value from an external device to the smartcard.

Figure 7:
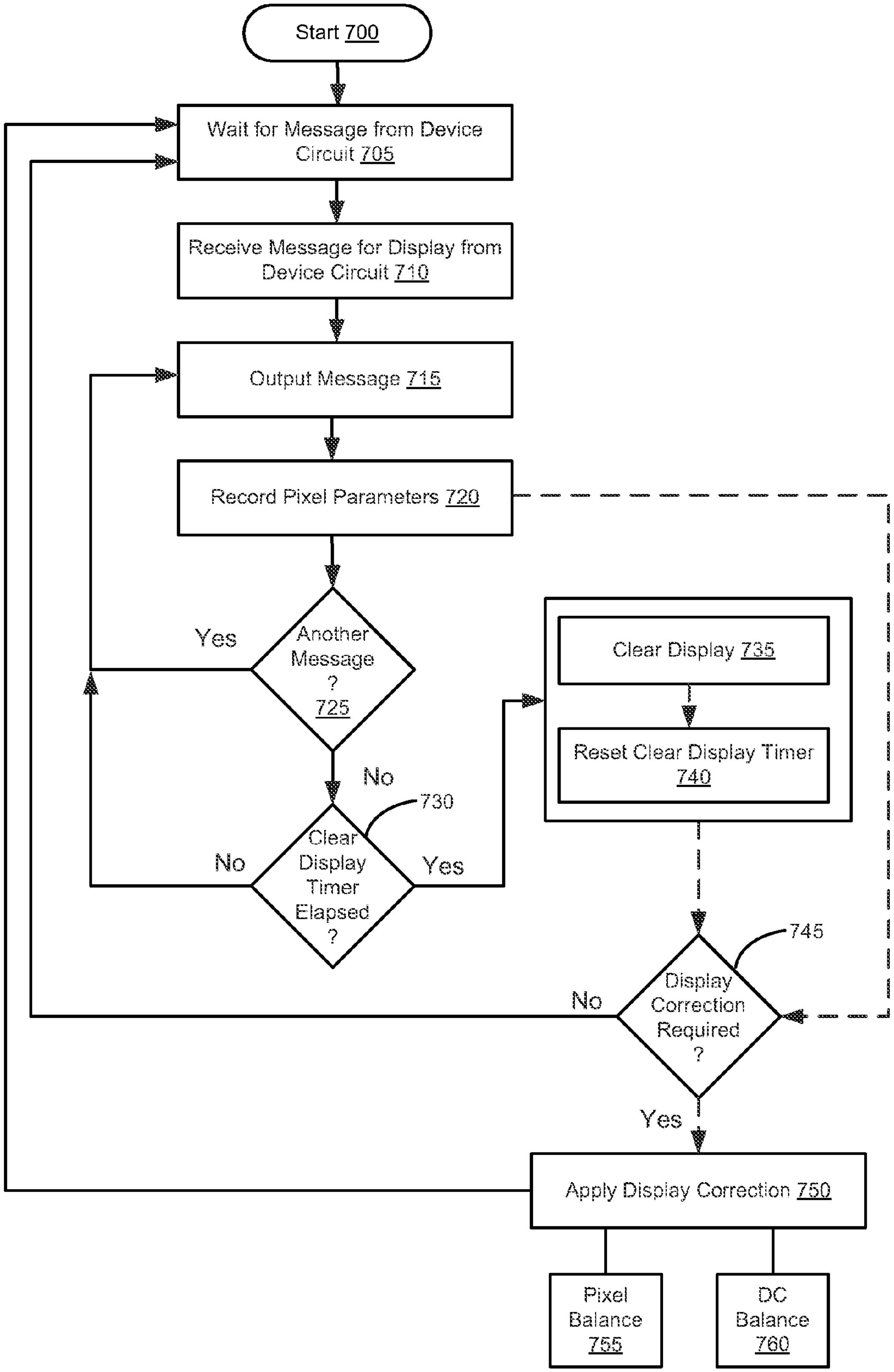
FIG. 7 depicts a flow diagram for implementing one or more of embodiments.

Referring to FIG. 7, a process flow chart is shown for implementing one or more of the disclosed embodiments. The process is initiated at block 700 and continues to block 705. At block 705, a microcontroller 800 (FIG. 8) waits for a message to be received from the device circuit 815 (FIG. 8). When a message is received at block 710 by the microcontroller 800 from the device circuit 815, the message is output to the electrophoretic display at block 715 by the microcontroller 800. At block 720, the microcontroller 800 records certain parameters associated with the driving pulses applied to the pixels needed to display the message output at block 715.

At block 725, the microcontroller 800 determines whether another message is to be output to the electrophoretic display 100 (FIG. 1) If another message is to be output 725, the microcontroller 800 outputs the message to the electrophoretic display 100 as before at block 715 and likewise records the certain parameters in memory 802 associated with the driving pulses applied to the pixels needed to display the message of block 715 at block 720.

At block 725, if another message is not pending for output, the microcontroller 800 proceeds to block 730 to determine whether a clear display timer has elapsed. If microcontroller 800 determines that the clear display timer has not elapsed, the microcontroller 800 waits for another message to arrive as previously described for blocks 715, 720 and 725. If the microcontroller 800 determines at block 730 that the clear display timer has elapsed, the microcontroller 800 sends the proper driving pulses to clear electrophoretic display 100 at block 735. In one embodiment, the clearing of electrophoretic display 100 at block 735 also causes the microcontroller 800 at block 740 to reset the clear display timer to restart timing for clearing the electrophoretic display 100.

In one embodiment, the microcontroller 800 determines if a display correction is required at block 745. The display correction at block 745 may be provided to substantially equalize the number of times a driving pulse is applied to individual pixels, the number of resets to a particular color state for individual pixels, the number of resets to two or more color states for the individual pixels and/or correction of a relative DC imbalance among the individual pixels as described above. At block 745, if the microcontroller 800 determines that display correction is not required, the microcontroller 800 returns to block 705 to wait for a message 820 from the device circuit 815 as previously described.

At block 745, if the microcontroller 800 determines that display correction is required, the microcontroller 800 proceeds to block 750 which applies one or more of the above described display corrections to the multi-pixel electrophoretic display 100 such as pixel drive pulse balance 755 and/or DC balance 760.

In one embodiment, at block 750, once the display correction has been applied and completed, the microcontroller 800 returns to block 705 to wait for a message 820 from the device circuit 815 as previously described.

Referring to FIG. 8, an exemplary block diagram of a microcontroller circuit suitable for implementing the various embodiments described is shown. In one embodiment, a microcontroller 800 includes a memory 802 and an internal clock 804. The microcontroller 800 may be of any common programmable type such as an ASIC, FPGA, CPLD, LSIC, microprocessor, programmable logic gate circuit or similar intelligent devices. The microcontroller 800 is provided with a DC power source 810 typically from a battery. In one embodiment, the microcontroller 800 is operatively coupled to a bi-stable driver controller 805.

The bi-stable driver controller 805 converts signals received from the microcontroller 800 into voltage driving pulses which are supplied to the bi-stable display 100 by connections 805*a*, 805*b*. In one embodiment, the bi-stable controller provides 50 millisecond (ms) to 500 ms electrical driving pulses to the bi-stable display 100. In one embodiment, the multi-pulse voltage driving frames of 200 ms to 1500 ms are provided by the bi-stable driver controller 805 to the bi-stable display 100. In one embodiment, the microcontroller 800 and bi-stable driver controller 805 are integrated into a single form factor. For example, a field programmable gate array (FPGA) coupled to the bi-stable display 100 using bipolar op-amps.

In one embodiment, the bi-stable controller 805 typically includes a DC-DC converter 807 which is used to increase the voltage supplied from the DC power source 810 to about 30-40 VDC. The messages 820 received from the device circuit 815 cause microcontroller 800 to signal the bi-stable controller 805 to output the message 820 to the bi-stable (electrophoretic) display 100.

In one embodiment, the microcontroller 800 is provided with logical instructions to perform the display corrective implementations described above, including but not limited to, substantially equalizing the number of times a driving pulse is applied to individual pixels of bi-stable display 100, the number of resets to a particular color state for individual pixels of bi-stable display 100, the number of resets to two or more color states for the individual pixels of bi-stable display 100 and/or correction of a relative DC imbalance among the individual pixels of bi-stable display 100 as described above.

Although the foregoing disclosure has been described in some detail for purposes of clarity of understanding, it will be apparent to a person having ordinary skill in that art that certain changes and modifications may be practiced within the scope of the appended claims. It should be noted that there are many alternative ways of implementing both the process and apparatus of the improved driving scheme for an electrophoretic display, and for many other types of displays including, but not limited to, liquid crystal, rotating ball, dielectrophoretic and electrowetting types of displays. Accordingly, the present embodiments are to be considered as exemplary and not restrictive, and the inventive features are not to be limited to the details given herein, but may be modified within the scope and equivalents of the appended claims.

What is claimed is:

1. A method for driving a display device which comprises a plurality of pixels each of which is sandwiched between a common electrode common to all pixels and a pixel electrode, and is capable of displaying a first color or a second color, the method comprising applying a driving sequence which comprises:

a) for a first time period, applying no voltage potential to the common electrode, applying a first voltage potential to pixel electrodes corresponding to a first group of pixels, and applying no voltage potential to pixel electrodes corresponding to a second group of pixels of the second color, to cause the display device to display a onetime image of the first color with a background of the second color;

b) for a second time period, applying no voltage potential to the common electrode, applying no voltage potential to the pixel electrodes corresponding to the first group of pixels, and applying a second voltage potential to the pixel electrodes corresponding to the second group of pixels, to clear the onetime image created in step (a); and c) for a third time period, applying a third voltage potential to the common electrode, and applying no voltage potential to the pixel electrodes corresponding to the first and second groups of pixels;

wherein time lengths of the first, second and third time periods are equal, and the driving sequence is DC balanced; and wherein the driving sequence display a onetime password image used in a smartcard application, and the driving sequences reset the plurality of pixels to clear the onetime password image.

2. The method of claim 1, comprising applying a corrective waveform to correct an imbalance.

3. The method of claim 2, further comprising:

receiving a new message demand when the corrective waveform is applied;

overriding the corrective waveform with driving sequences associated with the new message demand;

re-applying the corrective waveform such that time integrals of net magnitudes of the voltage potentials of the driving sequence are substantially equal for all of the plurality of pixels.

4. The method of claim 1, wherein all of the plurality of pixels are reset to a common predetermined color state at about a common time.

5. The method of claim 1, wherein net magnitudes of the first, second and third voltage potentials are equal.

6. The method of claim 1, wherein for each of the plurality of pixels, applying a corrective waveform at a duration not discernable to an observer such that time integrals of net magnitudes of voltage potentials of the driving sequence are substantially equal for all of the plurality of pixels.

* * * * *